W. L. Peet,
Horse Power.
N° 60,933.   Patented Jan. 1, 1867.

Witnesses:

Inventor:

United States Patent Office.

WARREN L. PEET, OF MAPLE RAPIDS, MICHIGAN.

Letters Patent No. 60,933, dated January 1, 1867.

---

IMPROVEMENT IN HORSE POWERS.

---

*The Schedule referred to in these Letters Patent and making part of the same.*

---

TO ALL WHOM IT MAY CONCERN:

Be it known that I, WARREN L. PEET, of Maple Rapids, in the county of Clinton, and State of Michigan, have invented a new and useful "Improvement in Horse-Power Machines;" and I do hereby declare that the following is a full, clear, and exact description thereof, which will enable others skilled in the art to make and use the same, reference being had to the accompanying drawings, forming part of this specification.

The present invention relates to a horse power machine to be used for threshing grain, sawing wood, and for any other of the purposes to which horse powers are generally applied, and consists in a novel construction and arrangement of the same, as will be hereinafter more fully described, reference being had to the accompanying plate of drawings, of which—

Figure 1:
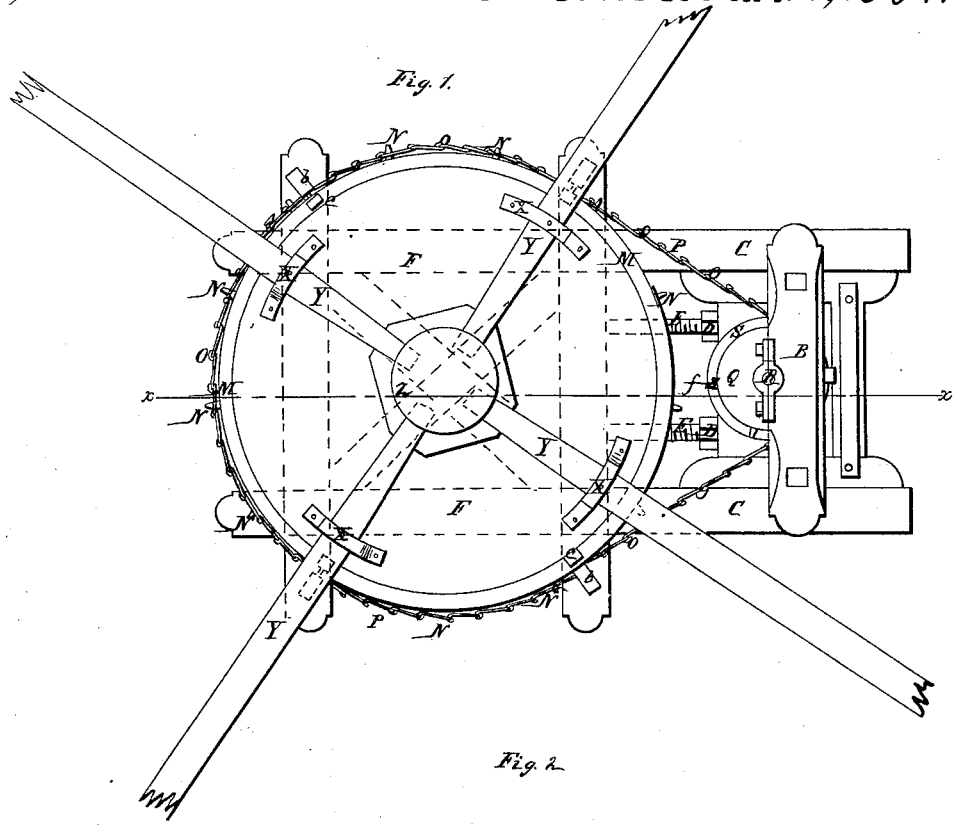

Figure 1 is a plan or top view.

Figure 2:
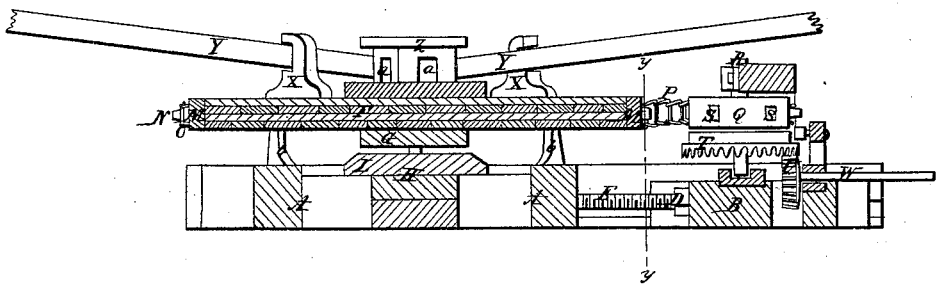
Figure 3:
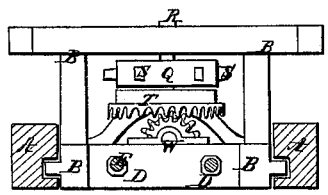

Figure 2, a longitudinal vertical section taken in the plane of the line $x\,x$, fig. 1; and Figure 3, a transverse vertical section taken in the plane of the line $y\,y$, fig. 2.

A A, in the drawings, represent the foundation of the machine, which consists of a solid wooden frame, with a horizontal frame, B, moving in and guided by parallel ways, C C, nuts D D of bolts E E being used for setting the frame B at any desired position, for a purpose to be hereafter explained. F, the drive-wheel, placed in a horizontal position, and turning by a cast-iron box, G, upon a cast-iron spindle, H, set and fixed in a box L, bolted or otherwise properly secured upon the foundation A. This drive-wheel is made of plank, one inch thick, four in number, placed one upon the other, and secured together by bolts, &c., and with cast-iron segments, M, around its periphery, having, at regular and equal distances about the same, projecting teeth or cogs, N N, one cog to every four links, O O, of an endless chain, P, passing partially around the drive-wheel, and from the same to and around another wheel, Q, turning in bearings by its shaft, R, of the slide frame B, before referred to. The wheel Q also has cogs or teeth, S S, around its periphery, and engages by a toothed crown-wheel, T, upon its under side with a vertical gear-wheel, U, upon the horizontal shaft W, turning in bearings of the slide frame. Upon the drive-wheel E are fixed four travellers, X, through each of which passes a lever-rod, Y, entering by its inner end a notch, $a$, formed in the centre capstan or head Z, of the wheel. $b\,b\,b$ a series of standards fixed in the foundation A, having friction-rollers, $c\,c$, in their upper ends bearing and running upon the top face of the drive-wheel. When the endless chain belt becomes loose by wear, it is only necessary, in order to tighten the same, to screw up the nuts D D, thus causing the slide frame to move forward and away from the drive-wheel, consequently tightening the belt, as is obvious without further description.

By my construction and arrangement of the horse power above described, it is much more economical than any other horse power heretofore used, and by running it with an endless belt, less wheels are required and the power considerably increased.

I claim as new, and desire to secure by Letters Patent—

The combination of the sliding frame B, wheel Q, endless chain P, and driving-wheel F, constructed and arranged to operate in the manner as and for the purpose herein specified.

The above specification of my invention signed by me this 2d day of October, 1865.

WARREN L. PEET.

Witnesses:
HENRY M. PERRIN,
PALMER D. BANCROFT.